US008030593B2

(12) United States Patent
Yoshikawa

(10) Patent No.: US 8,030,593 B2
(45) Date of Patent: Oct. 4, 2011

(54) LASER WELDING APPARATUS AND METHOD UTILIZING REPLACEABLE BEAM GUIDE AND CALIBRATION SYSTEM

(75) Inventor: Nobuhiro Yoshikawa, Kawasaki (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 775 days.

(21) Appl. No.: 11/726,524

(22) Filed: Mar. 22, 2007

(65) Prior Publication Data

US 2007/0221639 A1 Sep. 27, 2007

(30) Foreign Application Priority Data

Mar. 23, 2006 (JP) ................................. 2006-081548
Feb. 19, 2007 (JP) ................................. 2007-037971

(51) Int. Cl.
*B23K 26/06* (2006.01)

(52) U.S. Cl. ........... 219/121.63; 219/121.6; 219/121.67; 219/121.78; 219/121.82; 219/121.73; 219/121.64; 348/144; 359/641; 359/822; 359/823; 359/824; 385/79; 385/134; 385/60; 385/74; 385/75

(58) Field of Classification Search ............. 219/121.63, 219/121.6, 121.67, 121.78, 121.82; 359/822–824; *B23K 26/06*
See application file for complete search history.

(56) References Cited

U.S. PATENT DOCUMENTS

| | | | | |
|---|---|---|---|---|
| 4,290,667 A | * | 9/1981 | Chown | 385/33 |
| 4,578,554 A | * | 3/1986 | Coulter | 219/121.63 |
| 4,626,999 A | * | 12/1986 | Bannister | 700/166 |
| 4,838,631 A | * | 6/1989 | Chande et al. | 359/201.1 |
| 4,844,574 A | * | 7/1989 | Chande | 385/33 |
| 4,997,250 A | * | 3/1991 | Ortiz, Jr. | 385/33 |
| 5,323,269 A | * | 6/1994 | Walker et al. | 359/739 |
| 5,670,064 A | * | 9/1997 | Nakata | 219/121.6 |
| 5,907,648 A | * | 5/1999 | Miller et al. | 385/33 |
| 5,937,123 A | * | 8/1999 | Frelier | 385/79 |

(Continued)

FOREIGN PATENT DOCUMENTS

DE 10 2004 038 310 2/2006

(Continued)

OTHER PUBLICATIONS

Vanzetti et al, "New Laser Soldering has Vision", Nov. 3, 1987, International Conference on Industrial Electronics, Control and Instrumentation, pp. 717-721.*

(Continued)

*Primary Examiner* — Henry Yuen
*Assistant Examiner* — Brett Spurlock
(74) *Attorney, Agent, or Firm* — Drinker Biddle & Reath LLP

(57) ABSTRACT

A laser welding apparatus and method for easily adjusting a laser focusing position according to a distance from a laser irradiating device to a laser irradiating point on a work piece, or a welding point. A post-collimation laser diameter is measured when the laser emitting end has an optimal laser diameter on the work piece with respect to the distance from the laser processing head to the work piece. Corresponding data is stored with the above distance and the post-collimation laser diameter corresponding to each other. During welding, a diameter of the laser beam passing through a collimate lens is measured by a laser diameter measuring device. The post-collimation laser diameter is adjusted to be an optimal value according to the corresponding data.

16 Claims, 4 Drawing Sheets

U.S. PATENT DOCUMENTS

| | | | |
|---|---|---|---|
| 5,963,374 A * | 10/1999 | Endou et al. | 359/641 |
| 6,118,471 A * | 9/2000 | Sumi | 347/253 |
| 6,201,211 B1 * | 3/2001 | Emmelmann | 219/121.63 |
| 6,260,976 B1 * | 7/2001 | Endou et al. | 359/846 |
| 6,891,608 B2 * | 5/2005 | Byer et al. | 356/153 |
| 2001/0010003 A1 * | 7/2001 | Lai | 606/107 |
| 2003/0183744 A1 * | 10/2003 | Nantel et al. | 250/201.2 |
| 2004/0084426 A1 * | 5/2004 | Okada | 219/121.68 |
| 2004/0118818 A1 * | 6/2004 | Oda et al. | 219/121.64 |
| 2005/0150876 A1 | 7/2005 | Menin et al. | |
| 2006/0028935 A1 * | 2/2006 | Mori et al. | 369/44.37 |

FOREIGN PATENT DOCUMENTS

| | | |
|---|---|---|
| EP | 1 288 835 A1 | 8/2002 |
| EP | 1 600 244 A1 | 11/2005 |
| EP | 1 688 209 | 8/2006 |
| EP | 1 716 963 | 11/2006 |
| FR | 2 689 254 | 10/1993 |
| JP | 59-054486 | 3/1984 |
| JP | 59054486 A * | 3/1984 |
| JP | 04026817 A * | 1/1992 |
| JP | 07-303978 | 11/1995 |
| JP | 10058179 A * | 3/1998 |
| JP | 2001246489 A * | 9/2001 |
| JP | 2005-177862 | 7/2005 |
| WO | WO 2006015795 A1 * | 2/2006 |

OTHER PUBLICATIONS

Freudenrich, "How Fiber Optics Work", 2001, http://electronics.howstuffworks.com/fiber-optic.htm.*

* cited by examiner

LASER WELDING APPARATUS AND METHOD UTILIZING REPLACEABLE BEAM GUIDE AND CALIBRATION SYSTEM

CROSS-REFERENCE TO RELATED APPLICATION

This application claims priority from Japanese Patent Application Serial Nos. 2006-081548, filed Mar. 23, 2006, and 2007-037971, filed Feb. 19, 2007, each of which is incorporated herein in its entirety by reference.

TECHNICAL FIELD

The invention relates in general to an apparatus and method for performing laser welding operations and guiding laser beams for laser welding operations.

BACKGROUND

Laser welding is currently used to carry out robotic welding. Japanese Laid-Open Patent Publication No. 2005-177862 discloses an example of such a welding technique. A laser irradiating device is installed at a tip of a robotic arm for irradiating a laser beam. The robotic arm is moved and changes an irradiating direction of the laser beam emitted from the laser irradiating device such that a predetermined welding point is welded by moving the laser beam. Such type of welding is referred to as remote welding, which is often used when a distance between a work piece and the laser irradiating device is farther than that of the conventional welding.

When the robotic arm is implemented as described above, it may be necessary to adjust the focus of the laser beam according to the distance from the laser irradiating device to the laser irradiating point on the work piece. Japanese Laid-Open Patent Publication No. (Hei.) 5-2146 discloses a method for adjusting the laser focusing distance. Such a method comprises measuring the distance from the laser irradiating device to the laser irradiating point on the work piece and adjusting a lens system within the laser irradiating device.

BRIEF SUMMARY OF THE INVENTION

Embodiments of a laser welding apparatus and method for easily adjusting a laser focusing position according to a distance from a laser irradiating device to a laser irradiating point, or welding point, on a work piece are taught herein.

One example of a laser welding apparatus for performing welding by irradiating a laser beam comprises a laser oscillator for generating a laser beam, a laser irradiating device for changing an irradiating direction of the laser beam and operable to irradiate the laser beam at a laser irradiating point, a beam guiding device operable to guide the laser beam from the laser oscillator to the laser irradiating device, wherein the beam guiding device has a laser emitting end, a lens disposed on the laser irradiating device between the laser emitting end and the laser irradiating point and a distance changing device operable to change a first distance between the laser emitting end and the lens.

Another example of a laser welding apparatus for performing welding by irradiating a laser beam taught herein comprises means for generating a laser beam, means for changing an irradiating direction of the laser beam and for irradiating the laser beam at a laser irradiating point, means for guiding the laser beam from the generating means to the changing means, wherein the guiding means has a laser emitting end and distance changing means for changing a first distance between the guiding means and a lens disposed on the changing means, the lens located between the guiding means and the laser irradiating point.

An example of a method of adjusting a laser beam of a laser welding apparatus is below. The laser welding apparatus includes a laser oscillator for generating the laser beam, a laser irradiating device operable to change an irradiating direction of the laser beam at a laser irradiating point and a beam guiding device for guiding the laser beam from the laser oscillator to the laser irradiating device. The laser irradiating device includes a lens between the beam guiding device and the work piece. The method comprises detaching the beam guiding device from the laser irradiating device, attaching a second beam guiding device to the laser irradiating device or to a second laser irradiating device and changing a first distance between the second beam guiding device and an associated lens such that a laser diameter of a laser irradiating point becomes an optimal diameter with respect to a second distance from the second laser irradiating device to the laser irradiating point.

BRIEF DESCRIPTION OF THE DRAWINGS

The description herein makes reference to the accompanying drawings wherein like reference numerals refer to like parts throughout the several views, and wherein.

DETAILED DESCRIPTION OF EMBODIMENTS OF THE INVENTION

In the conventional remote welding described above, the lens system within the laser irradiating device generally comprises a plurality of lenses. It may be necessary to set the lens position of the laser irradiating device prior to conducting a laser welding operation. This means that a laser diameter of the laser irradiating point on the work piece needs to be optimal, which is determined according to the distance from the laser irradiating device to the laser irradiating point on the work piece.

However, the laser irradiating device and the beam guiding device may become worn out due to their prolonged usage. In such a case, the laser irradiating device and the beam guiding device should be replaced with new counterparts. During such replacement, there may be a slight offset in the positional relationship between the laser irradiating device and the optical fiber. Accordingly, the focus, which provides an optimal laser diameter from the laser irradiating device, may be changed.

Thus, the lens position may need to be set once again such that the laser diameter of the laser irradiating point on the work piece becomes optimal according to the distance from the laser irradiating device to the laser irradiating point on the work piece. An additional burden must be incurred each time when the laser irradiating device is replaced, thereby affecting the effectiveness and efficiency of the overall process.

In contrast, as taught herein a distance changing device is configured to change the laser diameter on the work piece so_ that it becomes an optimal value by changing the distance between the laser beam guiding device and the laser irradiating device. Even when replacing a laser emitting device, only a simple focusing adjustment is needed between the laser beam guiding device and the laser emitting device. Therefore, there is no need to repetitively provide the lens position each time when the laser irradiating device is replaced.

Hereinafter, embodiments of the invention are described with reference to the accompanying drawings.

Figure 1:
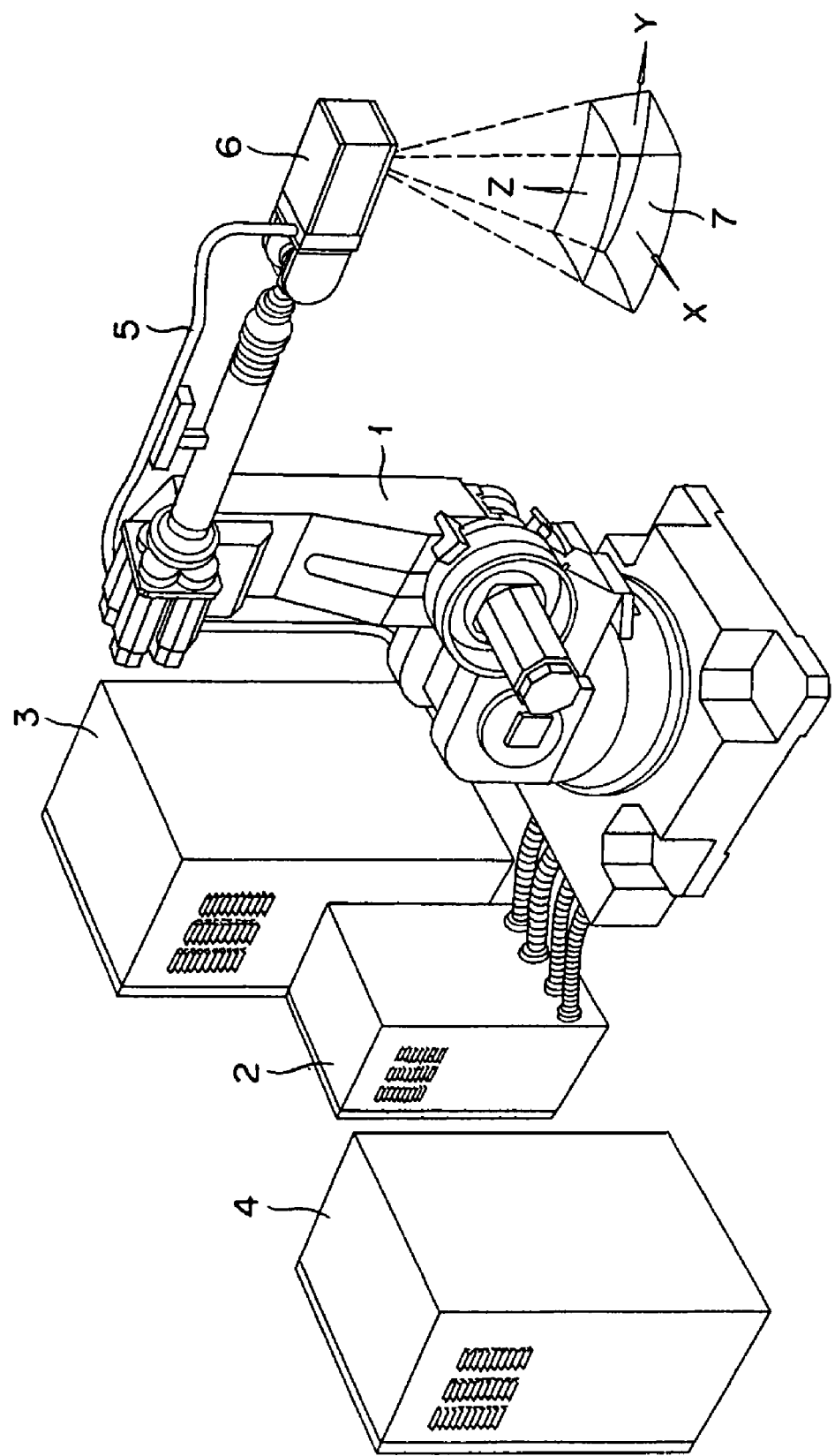
FIG. 1 is a schematic diagram illustrating a laser welding apparatus constructed in accordance with an embodiment of the invention.

FIG. 1 is a schematic diagram illustrating a remote laser welding system constructed in accordance with one embodiment of the invention. The system shown in FIG. 1 is configured to weld a work piece from a position away from the work piece using a laser. Thus, the remote welding system can weld without directly contacting a welding jig with the work piece. Such type of welding is referred to as remote welding and is different from conventional welding such as spot welding.

FIG. 1 discloses a robot 1 and a robot controller 2 for controlling the robot 1 according to instructions from a control unit 4. A laser processing head 6 irradiates a laser beam and is installed at a tip of an arm of the robot 1. An optical fiber cable 5 operates as a beam guiding device for guiding the laser beam from a laser oscillator 3, which generates a laser beam for the laser processing head 6. The control unit 4 controls the laser processing head 6 and the laser oscillator 3.

The control unit 4 is a computer which has, for example, a central processing unit, a memory unit, etc. For example, control unit 4 and other control units described herein can consist of a microcomputer including a central processing unit (CPU), input and output ports (I/O), random access memory (RAM), keep alive memory (KAM), a common data bus and read only memory (ROM) as an electronic storage medium for executable programs and certain stored values as discussed hereinafter. The functions could be, for example, implemented in software as the executable programs, or could be implemented in whole or in part by separate hardware in the form of one or more integrated circuits (IC).

As for the laser oscillator 3, a YAG laser oscillator is used to guide the laser beam through the optical fiber cable 5 by example.

The robot 1 is a general multi-axis robot (also known as a multi-articulated robot, etc.). The robot 1 can change the position of its arm and allow the tip of the arm with the laser processing head 6 to move in various directions according to the motion path data provided by an instructional operation. A moving range of the laser irradiation is denoted by the reference numeral 7.

Figure 2:
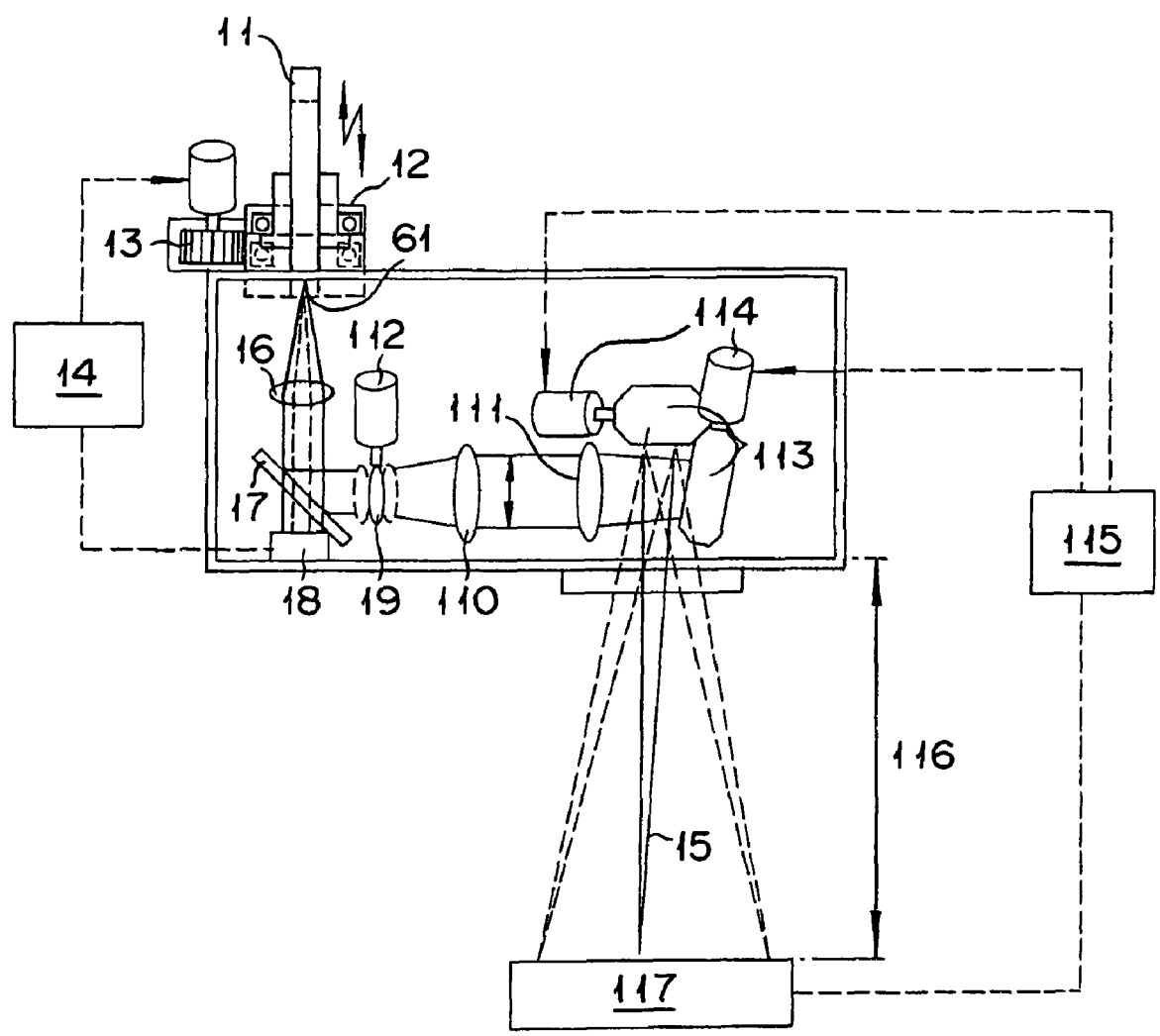
FIG. 2 is a diagram illustrating an embodiment of the inside of a laser processing head.

FIG. 2 is a diagram illustrating an inside of the laser processing head 6 serving as a laser irradiating device. Inside the laser processing head 6 is an optical fiber retaining portion 12 for retaining an optical fiber 11 in the optical fiber cable 5, which operates as a beam guiding device. Also inside the laser processing head 6 are a fiber position changing mechanism 13, a fiber actuator control unit 14, a collimate lens 16, a half mirror 17 and a laser diameter measuring device 18 for the post-collimation laser. Finally, a condensing distance varying lens 19 (i.e., a condensing lens), a first lens 110, a second lens 111, a condensing lens actuator 112, a reflecting mirror 113, a mirror actuator 114 and a mirror control unit 115 are included in the laser processing head 6.

The laser processing head 6 is configured such that the laser beam 15 passes through the collimate lens 16, the half mirror 17, the condensing lens 19, the first lens 110 and the second lens 111. The laser beam 15 is then reflected and emitted by reflecting mirror 113.

The reflecting mirror 113 can be rotatably moved by the mirror actuator 114. The mirror control unit 115 rotates the reflecting mirror 113 based on instructional data.

Consequently, in the laser welding apparatus, it is possible to irradiate the laser in various directions through motion of the laser processing head 6 by the robot and motion of the reflecting mirror 113.

Further provided in one embodiment of the invention is a laser diameter measuring device 117 for measuring the laser diameter irradiated on the work piece in addition to the laser measuring device 18 for measuring the laser diameter after passing through the collimate lens 16. As for the laser diameter measuring device 18, a light receiving device such as a CCD area sensor or a CMOS area sensor may be employed.

In this embodiment, an instructional operation for moving the laser processing head 6 is performed prior to conducting the laser processing. This instructional operation irradiates the laser beam 15 at various distances 116 from the laser processing head 6 to the laser diameter measuring device 117, as well as measures the irradiated laser diameter by the laser diameter measuring device 117. The position of the condensing lens 19 is changed by the condensing lens actuator 112 to optimize the laser diameter value, which is generally a minimum diameter wherein the laser diameter is the narrowest.

When the laser processing head 6 or the optical fiber 11 for guiding the beam becomes worn out due to prolonged usage, the laser processing head 6 should be removed from the optical fiber 11, which guides the laser beam from the laser oscillator to the laser processing head 6, so that either or both can be replaced with a new laser processing head or optical fiber 11. A slight offset of the positional relationship between the laser processing head 6 and the optical fiber 11 may be created due to the replacement, thereby changing the distance for an optimal laser diameter.

Thus, in one embodiment, the laser beam 15 is irradiated from the laser processing head 6 to the laser diameter measuring device 117 where the laser beam 15 is measured. The position of the laser emitting end 61 of the optical fiber 11 is adjusted to an optimal value, which is generally a minimum diameter wherein the laser diameter is the narrowest. The position of the laser emitting end 61 of the optical fiber 11 is adjusted to the same focus state as prior to replacement of the laser processing head 6, eliminating the need to repetitively set the lens position each time the laser processing head is replaced.

The post-collimation laser diameter is measured when the laser emitting end 61 has an optimal laser diameter on the work piece with respect to the distance from the laser processing head 6 to the work piece. The data is then stored in a table wherein the above distance and the post-collimation laser diameter correspond to each other. The corresponding table is stored in the fiber actuator control unit 14. The fiber actuator control unit 14 and the fiber position changing mechanism 13 perform the function of distance changing, or more specifically, changing the laser emitting end position.

Figure 3:
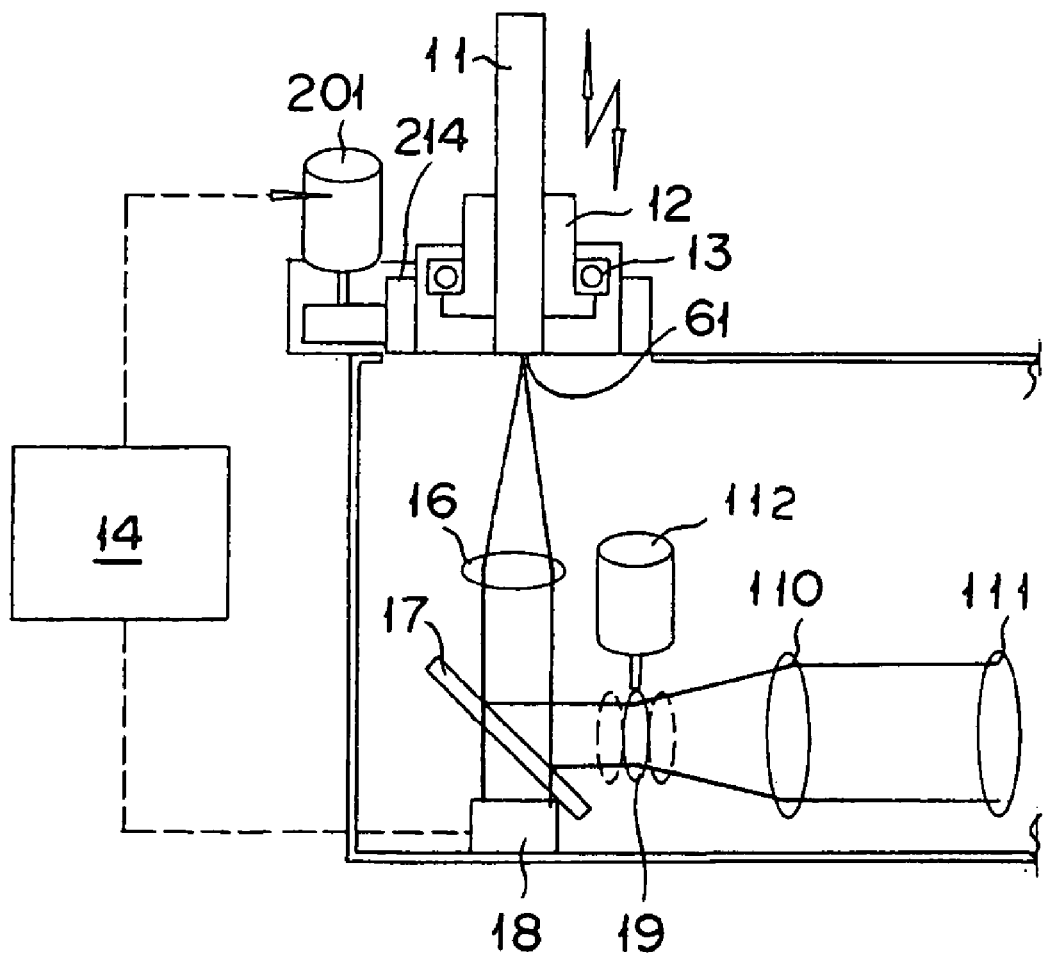
FIG. 3 is an enlarged view of a fiber position changing mechanism.

FIG. 3 is an enlarged view of the fiber position changing mechanism 13. The fiber position changing mechanism 13 retains the optical fiber 11 and can move the entire optical fiber 11. The fiber position changing mechanism 13 has an actuator 201 for moving the optical fiber 11 with each of the optical fiber retaining portions 12. It also has a gear mechanism 214. With this configuration, the position of the laser emitting end 61 of the optical fiber 11 can be moved as indicated by the arrow shown in FIG. 3.

Figure 4A:
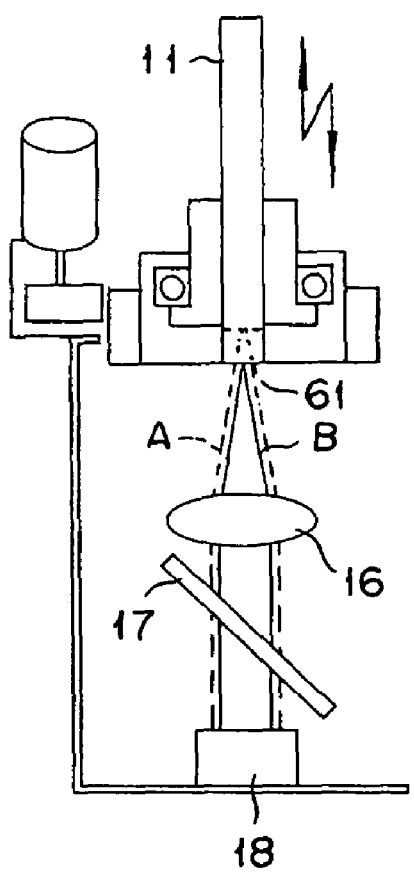
FIGS. 4A and 4B illustrate a position change of a laser emitting end controlled by a fiber actuator controlling device.
Figure 4B:
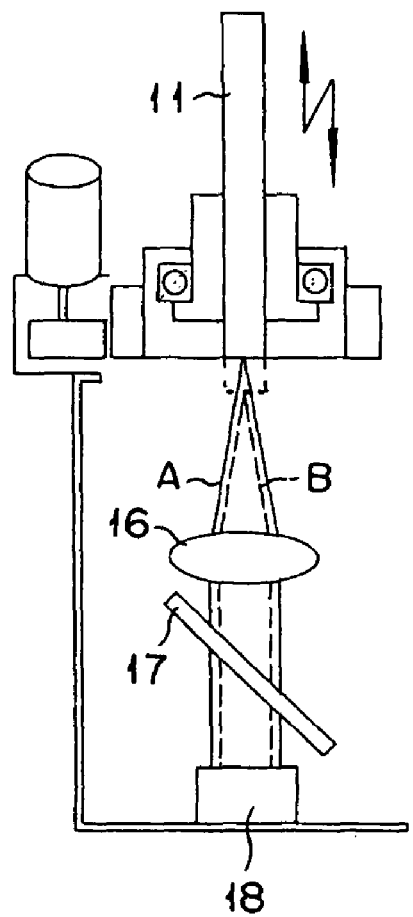

FIGS. 4A and 4B illustrate a position change of the laser emitting end 61 as it would be controlled by the fiber actuator control unit 14.

The fiber actuator control unit 14 first obtains an optimal value for the post-collimation laser diameter on the work piece, with respect to the distance from the laser processing head 6 to the work piece, by referring to the above-mentioned corresponding table. If the current laser diameter, after passing through the collimate lens 16 and measured by the laser diameter measuring device 18, is greater than the optimal value of the post-collimation laser diameter, then the position of the laser emitting end 61 is moved in a direction wherein the distance from the laser emitting end 61 to the collimate lens 16 becomes shorter (see FIG. 4A). Accordingly, the laser diameter before the collimate lens 16 and the laser diameter after the collimate lens 16 is reduced from A to B as shown in FIG. 4A.

Conversely, if the current laser diameter after passing through the collimate lens 16 is smaller than the optimal value of the post-collimation laser diameter, then the position of the laser emitting end 61 is moved in a direction wherein the distance from the laser emitting end 61 to the collimate lens becomes longer (see FIG. 4B). Accordingly, the laser diameter before the collimate lens 16 and the laser diameter after the collimate lens 16 is increased from B to A as shown in FIG. 4B.

The movement of the laser emitting end 61 is stopped at the point when the current laser diameter measured by the laser diameter measuring device 18 after passing through the collimate lens 16 becomes the optimal value for the post-collimation lens diameter. In both cases shown in FIGS. 4A and 4B, the laser diameter of the laser irradiating point on the work piece becomes smaller so as to be an optimal value.

Although this embodiment has been described with a fiber position changing mechanism 13 receiving control signals from the fiber actuator control unit 14 to change the position of the laser emitting end 61, the fiber position changing mechanism 13 could alternatively be replaced with, or used in addition to, a collimation lens changing mechanism receiving control signals from a control unit 14 to change the position of the collimation lens 16 in the directions indicated by the arrow in FIGS. 2, 3, 4A and 4B. The collimation lens changing mechanism could similarly include an actuator 201 and a gear mechanism 214 and would include a supporting mechanism for the collimation lens 16 such as known in the art. In this way, the collimation lens 16 can be moved further from the laser emitting end 61 in a like manner to that shown in FIG. 4A and can be moved closer to the laser emitting end 61 in a like manner to that shown in FIG. 4B.

After the post-collimation lens diameter is measured, the laser emitting end 61 is moved to set the post-collimation lens diameter to be a predetermined optimal value for the work piece if it is not already. Therefore, the readjustment of the focusing distance by the condensing lens is not required each time the laser processing head 6 is replaced, and there is no need to repetitively set the lens position.

An apparatus for distance measuring may also be installed at the laser processing head 6 up to the laser irradiating point on the work piece. Then, an optimal value of the post-collimation laser diameter is obtained from the corresponding table with respect to the distance measured by the distance measuring means so as to move the laser emitting end 61.

In a second embodiment of the invention, the laser is irradiated from the laser processing head 6 to a laser diameter measuring device 117, similar to the first described embodiment. The laser diameter being irradiated is measured to adjust the condensing distance varying lens 19 to an optimal value, which is generally a minimum diameter wherein the laser diameter is the narrowest. When the condensing distance varying lens 19 is moved, the laser diameter being irradiated is measured to adjust the position of the laser emitting end 61 of the optical fiber 11. By adjusting the position of the laser emitting end 61 of the optical fiber 11, the laser diameter is adjusted to an optimal value on the work piece.

A lens corresponding table stores data, the data being the distance from the laser processing head 6 to the laser diameter measuring device 117 and the corresponding position of the condensing distance varying lens 19 for optimal laser diameter on the work piece. Similar to the first described embodiment, in connection with the position of the condensing distance varying lens 19, the post-collimation laser diameter is also measured when the laser emitting end 61 has an optimal diameter on the work piece with respect to the distance from the laser processing head 6 to the work piece. This additional data is stored in the lens corresponding table, with the above distance and the post-collimation laser diameter corresponding to each other.

Accordingly, when the distance from the laser processing head 6 to the work piece is changed only by moving the laser emitting end 61, the position of the condensing distance varying lens 19 is moved by referring to the lens corresponding table. For a lesser change in the distance, the laser focus is adjusted by moving the position of the laser emitting end 61, similar to the description of the first embodiment.

A predetermined lens corresponding table is used even if the position of the condensing lens 19 is adjusted. Thus, changing of the focusing distance is minimized even when the distance from the laser processing head 6 to the work piece is substantially changed, making it possible to rapidly perform the desired focusing operation in the laser irradiating process.

It should be noted that the invention is not limited to the embodiments described above. For example, although the control units are shown as separate units, they could all be incorporated into a single unit.

Also, the laser diameter measuring device 18 can be provided with the half mirror 17 before collimate lens 16. The laser diameter measuring device 18 can be also provided with the half mirror 17, for example, between the condensing distance varying lens 19 and the first lens 110, as well as between the first lens 110 and the second lens 111. The half mirror 17 could be provided at any position after the collimate lens 16.

As another example, an optimal laser diameter on the work piece is defined as the value in which the laser diameter is the narrowest. However, the invention is not limited to such laser diameter. The optimal diameter may be a value for obtaining an energy required for performing a laser welding operation.

Additionally, when the laser diameter irradiated on the work piece is measured by using the laser diameter measuring device 117, the laser measured may be the laser beam that is utilized for welding. However, the power intensity of the laser beam may be lower than that of the actual welding operation. In this instance, the laser diameter itself is not changed even if the laser power intensity is lowered. An example of a laser source is a pilot laser of a visible light, which is irradiated from the laser oscillator 3 into the optical fiber and measured by the laser diameter measuring device 117.

Accordingly, the above-described embodiments have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A laser welding apparatus for performing welding by irradiating a laser beam, comprising:
    a laser oscillator for generating a laser beam;
    a laser irradiating device for changing an irradiating direction of the laser beam and operable to irradiate the laser beam at a laser irradiating point located at a second distance from the laser irradiating device;
    a laser irradiating pointer laser diameter measuring device for calibrating the diameter of the laser beam at a laser irradiating point;
    a replaceable beam guiding device operable to guide the laser beam from the laser oscillator to the laser irradiating device, wherein the beam guiding device has a laser emitting end;
    a collimating lens disposed on the laser irradiating device between the laser emitting end and the laser irradiating point at a first distanced from the laser emitting end of the beam guiding device, the collimating lens being shaped to output an inputted laser beam as a parallel beam;
    a condensing lens for condensing the parallel beam prior to irradiating the laser irradiating point;
    a distance changing device operable to change a first distance between the laser emitting end and the beam guiding device and the collimating lens; and
    a control unit programmed to:
        determine an optimal diameter of the laser irradiating point using the laser irradiating point laser diameter measuring device, the optimal diameter corresponding to the second distance between the laser irradiating device and the laser irradiating point;
    store a first relationship between a plurality of laser irradiating point diameters at the laser irradiating point and corresponding post-collimation laser diameters of the parallel beam such that each of the laser irradiating point diameters corresponds to an optimal diameter with respect to the second distance from the laser irradiating device to the laser irradiating point as the second distance varies; and
    actuate the distance changing device to obtain an optimal laser diameter of the laser beam at the laser irradiating point based on the first stored relationship.

2. The apparatus according to claim 1, wherein the distance changing device is a laser emitting end position changing device operable to change the first distance by moving a position of the laser emitting end.

3. The apparatus according to claim 1, further comprising:
    wherein the control unit is further operable to:
        change the first distance such that the post-collimation laser diameter results in an optimal laser diameter of the laser irradiating point by referring to the stored first relationship.

4. The apparatus according to claim 3 wherein the control unit is further operable to:
    store a second relationship between a plurality of condensing lens-positions and corresponding laser irradiating point diameters at the laser irradiating point such that each of the laser irradiating point diameters is a corresponding optimal diameter with respect the second distance from the laser irradiating device to the laser irradiating point as the second distance varies.

5. The apparatus according to claim 3 wherein the control unit is further operable to:
    move a condensing lens position such that the condensing lens position results in the optimal laser diameter of the laser irradiating point by further referring to the stored second relationship.

6. The apparatus according to claim 1, wherein the condensing lens is located between the lens and the laser irradiating point.

7. The apparatus according to claim 6, the apparatus further comprising:
    a condensing lens actuating device operable to changed position of the condensing lens closer to or further from the collimating lens.

8. The apparatus according to claim 6 wherein the control unit is further operable to store a third relationship of an optimal laser diameter of the laser irradiating point with respect to both the first distance and a third distance from the condensing lens position in the laser irradiating device to the laser irradiating point.

9. The apparatus according to claim 4, wherein the distance changing device is further operable to change the first distance and the condensing lens actuating device is operable to move the condensing lens corresponding to the stored relationship.

10. The apparatus according to claim 1, further comprising:
    wherein the distance changing device is a laser emitting and position changing device operable to change the first distance by moving the laser emitting end position responsive to the post collimation laser diameter.

11. The apparatus according to claim 1, further comprising:
    a reflecting mirror operable to, change an irradiating direction of the laser beam.

12. A laser welding apparatuss for performing welding by irradiating a laser beam, comprising:
    means for generating a laser beam;
    means for changing an irradiating direction of the laser beam and for irradiating the laser beam at a laser irradiating point hated at a second distance from the laser beam generating means;
    means for measuring the diameter of the laser beam at a laser irradiating point for calibrating the diameter of the laser beam at the laser irradiating point;
    replaceable means for guiding the laser beam from the generating means to the changing means, wherein the guiding means has a laser emmiting end;
    means for collimating the laser beam into a parallel beam;
    means for measuring the diameter of the parallel beam;
    means for condensing the parallel beam prior to irradiating the laser irradiating point;
    distance changing means for changing a first distance between the guiding means and a lens disposed on the changing means, the lens located between the guiding means and the laser irradiating point; and
    control means for:
        determining an optimal diameter of the laser irradiating point using the means for measuring the diameter of the laser beam at laser irradiating point, the optimal diameter corresponding to the second distance between the laser irradiating point and the laser beam generating means;
        storing a relationship between a plurality of laser irradiating point diameters at the laser irradiating point and corresponding post-collimation laser diameters of the parallel beam such that each of the laser irradiating point diameters corresponds to and optimal diameter with respect to the second distance from the laser beam generating means to the laser irradiating point as the second distance varies; and actuating the distance changing means to obtain an optimal diameter of the laser beam at the laser irradiating point based on the stored relationship.

13. A method of adjusting a laser beam of a laser welding apparatus including a laser oscillator for generating the laser beam, a laser irradiating device operable to change an irradiating direction of the laser beam at a laser irradiating point, a laser irradiating point laser diameter measuring device for calibrating the diameter of the laser beam at a laser irradiating point, and a replaceable beam guiding device for guiding the law beam from the laser oscillator to the laser irradiating device; and wherein the laser irradiating device includes a collimating lens between the beam guiding device and the laser irradiating point for producing a parallel laser beam, the method comprising:

detaching the replaceable beam guiding device from the laser irradiating device;

attaching a second replaceable beam guiding device to the laser irradiating device or to a second laser irradiating device;

determining a laser diameter at the laser irradiating point using the laser irradiating point laser diameter measuring device;

measuring a diameter of the parallel laser beam; and automatically changing a liar distance between the second beam guiding device and an associated lens based on a stored relationship between a plurality of laser diameters at the laser irradiating point and corresponding parallel laser beam diameters such that the laser diameter of the laser irradiating point becomes an optimal diameter with respect to a second distance from the second laser irradiating device to the laser irradiating point.

14. The method according to claim 13 wherein changing to first distance comprises moving the beam guiding device closer to or further from the lens.

15. The method according to claim 13, further comprising:

storing a respective optimal laser irradiating point diameter of the laser irradiating point with respect to a plurality of first distances prior to detaching the beam guiding device; and wherein changing the first distance between the new beam guiding device and the associated lens further includes changing the first distance according to the laser diameter of the laser irradiating point and data resulting from the storing.

16. The method according to claim 13, the method further comprising:

condensing the parallel beam using a condensing lens; and changing a location of the condensing lens with respect to the collimating lens such that the laser diameter of the laser irradiating point becomes the optimal diameter with respect to the second distance from the new laser irradiating device to the laser irradiating point.

* * * * *